(12) United States Patent
Gibbs

(10) Patent No.: US 8,302,478 B2
(45) Date of Patent: Nov. 6, 2012

(54) MAGNETOSTRICTIVE SUBSTANCE DETECTION SYSTEM AND METHOD

(75) Inventor: Michael Richard John Gibbs, Sheffield (GB)

(73) Assignee: The University of Sheffield, Sheffield (GB)

( * ) Notice: Subject to any disclaimer, the term of this patent is extended or adjusted under 35 U.S.C. 154(b) by 457 days.

(21) Appl. No.: 12/448,121

(22) PCT Filed: Nov. 16, 2007

(86) PCT No.: PCT/GB2007/004383
§ 371 (c)(1),
(2), (4) Date: Oct. 21, 2009

(87) PCT Pub. No.: WO2008/068454
PCT Pub. Date: Jun. 12, 2008

(65) Prior Publication Data
US 2010/0058866 A1 Mar. 11, 2010

(30) Foreign Application Priority Data
Dec. 9, 2006 (GB) .................................. 0624596.3

(51) Int. Cl.
*G01H 13/00* (2006.01)
(52) U.S. Cl. ......................................................... 73/579
(58) Field of Classification Search ...................... 73/579
See application file for complete search history.

(56) References Cited

U.S. PATENT DOCUMENTS

| 5,684,276 | A | 11/1997 | Altemir | 177/210 FP |
| 6,688,162 | B2 | 2/2004 | Bachas et al. | 73/64.42 |
| 7,302,829 | B2 | 12/2007 | Zribi | 73/29.01 |
| 7,331,231 | B2 | 2/2008 | Lee et al. | 73/579 |
| 2005/0074904 | A1 | 4/2005 | Chin et al. | 436/526 |
| 2005/0116831 | A1 | 6/2005 | Zribi | 340/632 |

FOREIGN PATENT DOCUMENTS

| EP | 1 729 123 A2 | 12/2006 |
| GB | 2383846 A | 9/2003 |
| WO | WO99/60330 | 11/1999 |
| WO | WO2005/026681 | 3/2005 |

OTHER PUBLICATIONS

Int'l Prel. Rept on Paten, Jun. 18, 2009, Univ of Sheffield.
Daniel Jones, Search Report under Section 17 for Application No. GB0624596.3, Jun. 18, 2007, UK Intellectual Property Office.

*Primary Examiner* — Peter Macchiarolo
*Assistant Examiner* — Tamiko Bellamy
(74) *Attorney, Agent, or Firm* — McDonald Hopkins LLC

(57) ABSTRACT

There is provided a method of detecting the presence of a substance comprising providing a cantilever (30) comprising a magnetostrictive material (34) and having an original resonant frequency. The method also comprises receiving the substance on the cantilever (30, 36) causing the resonant frequency of the cantilever (30) to change. The method also comprises applying a magnetic field to the cantilever (30) causing the resonant frequency to change to a reference resonant frequency and sensing when the resonant frequency becomes the reference resonant frequency.

14 Claims, 2 Drawing Sheets

MAGNETOSTRICTIVE SUBSTANCE DETECTION SYSTEM AND METHOD

The present application is a U.S. National Stage Application of International Patent Application Ser. No. PCT/GB2007/004383 filed on Nov. 16, 2007, which claims priority to Great Britain Provisional Patent Application No. GB 0624596.3 filed on Dec. 9, 2006.

The present invention relates to methods and systems for detecting substances, in particular by using an electromechanical cantilever having a magnetic component.

The invention is particularly applicable in the field of micro electromechanical systems (MEMS) cantilevers.

MEMS cantilevers are known structures and are typically used in applications to provide high sensitivity detectors. It is known that for a simple cantilever beam system, the fundamental resonant frequency at which the beam vibrates in a transverse direction is a function of, amongst other things, Young's modulus (E) of the beam and the density ($\rho$). The resonant frequency is proportional to $\sqrt{E}$ and inversely proportional to $\sqrt{\rho}$.

A magnetostrictive or magnetoelastic material is one which changes shape when a magnetic field is applied to it. Accordingly, the Young's modulus of a magnetostrictive material is dependent upon any magnetic field which is applied to it (this is called the $\Delta E$-effect).

The present invention uses these two effects to provide a new substance detection method and system.

According to one aspect of the present invention there is provided a method of detecting the presence of a substance comprising providing a cantilever comprising a magnetostrictive material and having an original resonant frequency; receiving the substance on the cantilever causing the resonant frequency of the cantilever to change; applying a magnetic field to the cantilever causing the resonant frequency to change to a reference resonant frequency; and sensing when the resonant frequency becomes the reference resonant frequency.

According to another aspect of the present invention there is provided a substance detection system comprising a cantilever comprising a magnetostrictive material and having an original resonant frequency, the cantilever being arranged to receive the substance causing the resonant frequency of the cantilever to change, the system further comprising a magnetic field generator arranged to apply a magnetic field to the cantilever causing the resonant frequency to change to a reference resonant frequency and a sensor arranged to sense when the resonant frequency becomes the reference resonant frequency.

Since the cantilever comprises a magnetostrictive material, it resonates when a magnetic field of a particular frequency (the resonant frequency of the cantilever) is applied to it.

Advantageously, this method and system uses knowledge of the magnetic field dependence of the resonant frequency of the cantilever to manipulate the resonant frequency to a desired value (the reference resonant frequency). Also advantageously the present invention senses when the resonant frequency of the cantilever reaches the reference resonant frequency and so does not need to detect a broad frequency range around the reference resonant frequency. Accordingly a high quality factor, low noise detector can be provided.

Embodiments of the present invention will now be described, by way of example only, with reference to the accompanying drawings in which:

FIG. 1 schematically shows a substance detection system according to an embodiment of the invention;

Figure 1:
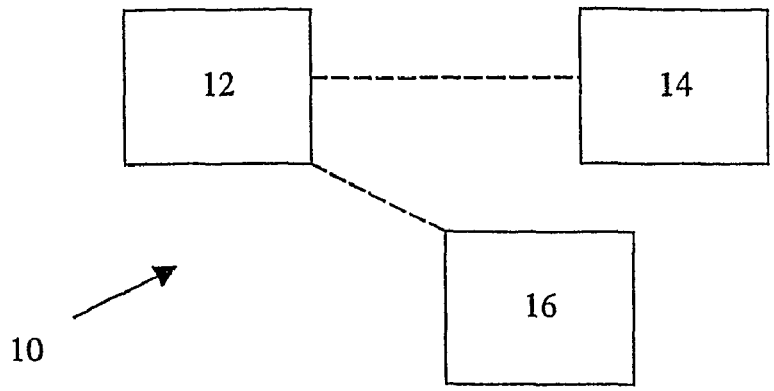

Referring to FIG. 1 a substance detection system 10 according to a first embodiment of the invention comprises a magnetic cantilever 12, a magnetic field generator 14 and a sensor 16. The magnetic cantilever 12 has an original resonant frequency and is arranged to receive a substance to be detected. If the cantilever does receive such a substance then the resonant frequency of the cantilever changes. This is because the effective density of the cantilever changes. The relationship between the resonant frequency of a simple cantilever and its effective density is discussed above. For simplicity and clarity it is assumed that the effective density of the cantilever increases due to the mass of the substance (it is assumed that the volume of the substance is much less than the volume of the cantilever). Accordingly, the resonant frequency of the cantilever is decreased upon receipt of the substance in such a situation. In other embodiments, an increase in frequency may be observed for certain geometries and modes of vibration. The magnetic field generator 14 comprises an electromagnet arranged to apply a magnetic field to the cantilever 12 which causes the resonant frequency to change due to the fact that in an applied magnetic field, the Young's modulus of the magnetic cantilever will change. (In this situation a further assumption is made that the magnetic cantilever is not originally magnetically saturated). In other embodiments the generator may be in the form of a set of coils.

The sensor 16 is arranged to sense when the resonant frequency becomes a reference resonant frequency, which is chosen such that it is indicative of some of the substance having been received on the cantilever. As the magnetic field generator 14 increases the magnetic field applied to the cantilever 12, the resonant frequency of the cantilever 12 will change until it reaches the reference resonant frequency. This is because the magnetic field applied by the field applier 14 is sufficiently large to effect this change in the resonant frequency of the cantilever 12. When the reference frequency is reached the applied magnetic field can be recorded. This magnetic field provides an indicator of the change in resonant frequency caused by the substance captured on it and hence of the mass of the substance which has been captured.

Figure 2:
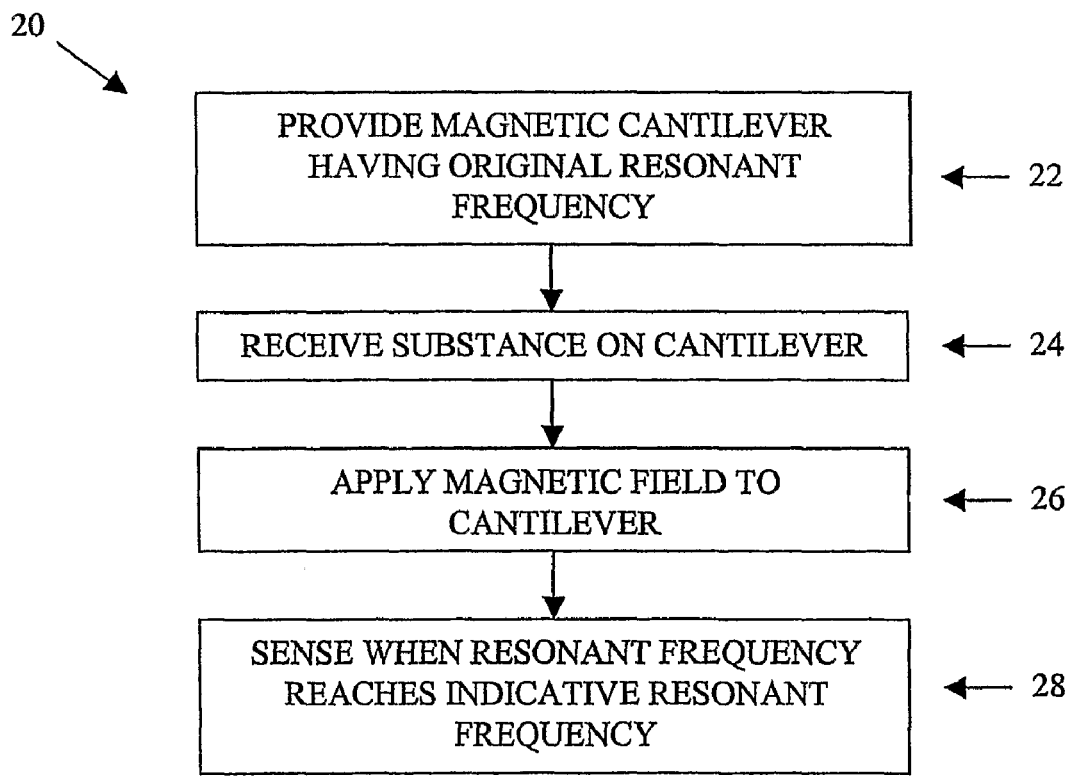
FIG. 2 is a flow chart schematically illustrating a method according to the embodiment of FIG. 1.

Referring to FIG. 2, a method of detecting the presence of a substance using the system of FIG. 1 is illustrated. The method 20 comprises the steps of providing 22 a magnetic cantilever having an original resonant frequency, receiving 24 the substance on the cantilever which causes the resonant frequency of the cantilever to change, applying 26 a varying magnetic field to the cantilever causing the resonant frequency of the cantilever to change until it becomes equal to a reference frequency (which is indicative of detection of the substance) and sensing 28 when the resonant frequency becomes the reference frequency.

In one embodiment, the cantilever is made to have an original resonant frequency in a particular applied field. In use, there may or may not be a background applied field and the resonant frequency of the cantilever can therefore be set to a chosen initial frequency by application of the initial applied magnetic field. When some of the substance to be detected is captured by the cantilever, an increase in the density of the cantilever leads to a decrease in the resonant frequency of the cantilever as described above. When the magnetic field generator subsequently applies a varying magnetic field about the value of the initial applied field to the cantilever, this causes the resonant frequency of the cantilever to vary as the magnetic field is varied. At some point, the resonant frequency of the cantilever passes through the reference frequency (i.e. the frequency at which the sensor is set to operate). In this embodiment the reference frequency is the original resonant frequency in the initial applied field.

In some embodiments, receiving the substance on the cantilever causes its resonant frequency to increase and in some embodiments receiving the substance causes the resonant frequency to decrease. This is dependent upon the substance being received and how it is received on the cantilever. This is a known factor, i.e. the type of reaction/reception on the cantilever is known when making the detection system. If an increase in the resonant frequency is required to then take the resonant frequency to the desired reference frequency, then the magnetic field applier may be arranged in some embodiments to decrease the magnetic field level to which the cantilever is exposed. If the resonant frequency of the cantilever is required to be decreased in order to bring it towards the reference frequency then the magnetic field generator maybe arranged in some embodiments to increase the level of the magnetic field applied to the cantilever.

Figure 3:
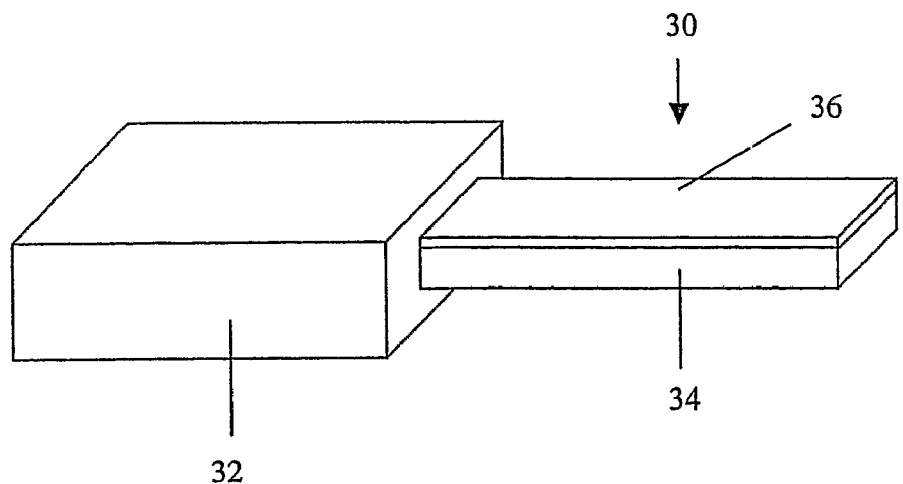
FIG. 3 is a schematic representation of a MEMS cantilever according to a further embodiment of the invention.

Referring to FIG. 3, a magnetic cantilever 30 according to a further embodiment of the invention is attached to a base 32. The cantilever 30 comprises a magnetostrictive material layer 34 and a substance-receiving layer 36 thereon. The layers, 34, 36 have a substantially identical plan section in this embodiment. Both layers, 34, 36 have a substantially rectangular cross section. In other embodiments, the layers may not have a substantially identical plan section. In some embodiments the magnetostrictive material layer is larger in plan section than the substance receiving layer 36, i.e. the layer is formed substantially upon the layer 34.

The substance-receiving layer 36 is arranged to facilitate receiving the particular substance to be detected upon its surface due to its material properties. In this embodiment the substance is arranged to be adsorbed onto the surface of the substance receiving layer 36.

In other embodiments different substance-receiving layers may be provided. For example, substance-receiving layers which facilitate absorption or reaction with the substance to be received may be provided.

In this embodiment, the magnetic cantilever 30 is arranged to detect the desired substance by contact with it through airborne particles. For example the cantilever may be part of a badge worn by a person, or part of a ticket carried by a person, or part of any other device, which may or may not be portable. In other embodiments the cantilever may be arranged to detect a substance by contact through fluid-bone particles, for example in a liquid or in solution. In such applications, a MEMS cantilever works particularly well since the fact that it is operating in a liquid does not affect its performance unduly. This is because for such small structures and the scale of measurements being made, the effect of the changed effective density due to the substance mass far out weighs the drag effects either caused by liquid/solution.

In some embodiments the sensor can be a very frequency-specific sensor. It is possible to provide a high Q, low noise, low cost, efficient sensor which is highly frequency specific. This can be used with the present invention since the sensor is required to only detect signals at a specific, predetermined, reference frequency. This provides significant advantages over any other systems in which broadband frequency detection is required. In this embodiment this advantage is linked to the fact that the magnetic field applier can apply a magnetic field sufficiently large to change the resonant frequency of the cantilever (after it has been initially changed by reception of the substance) back towards the original resonant frequency. At some point the resonant frequency will reach, and possibly pass through, the reference frequency at which the sensor operates. Therefore precise knowledge of the resonant frequency at which the cantilever ends up is not required to provide a highly sensitive and accurate detection system using this embodiment of the invention.

It will therefore be appreciated that for a highly sensitive detector the reference frequency should be chosen to be in a region where the field dependence of resonant frequency is highest. It will also however be appreciated that in some embodiments it may be desired to ignore when only a small amount of a substance has been detected. In such embodiments the sensor can be set or provided to operate at a reference frequency which is at a required level away from the original resonant frequency. In such a scenario, a sufficient amount of the substance needs to be received by the cantilever to ensure that application of a magnetic field will result in the resonant frequency passing through the reference frequency and therefore being sensed by the sensor.

It is also possible that the original resonant frequency of the cantilever is provided in an original magnetic field to which the cantilever is exposed, for example at all times. For example in a particular building there may be a background magnetic field. In such situations, the applied magnetic field will still change the resonant frequency of the cantilever and the magnetic field dependence of Young's modulus can still be used as previously described to detect the presence of a substance on the cantilever.

In further embodiments, reception of the mass on the cantilever may actually decrease the density of the cantilever and hence increase the resonant frequency of the cantilever. For example, if the substance reacts with the substance-receiving layer on the cantilever, an effect of the reaction might be to reduce the effective mass of the cantilever (and hence its effective density). In such a situation, increasing the applied magnetic field will decrease the resonant frequency of the cantilever back down towards the reference frequency, which is set at the original resonant frequency of an original magnetic field. In this way, the magnetic field generator will still have the effect (on the resonant frequency) of compensating for the effect caused by receiving the substance on the cantilever. In this embodiment, a sensitive detector is provided since even if only a very small amount of substance is received on the cantilever, when the magnetic field generator cantilever. It will at some point reach the original resonant frequency, i.e. the reference frequency.

Such a scenario may also arise where the substance to be received has a high volume in relation to the cantilever to the extent that receiving the substance causes a decrease in the density of the cantilever.

In this embodiment the magnetic field generator applies a DC magnetic field when exposing the cantilever to a magnetic field.

In some embodiments, the amount of magnetic field required to change the resonant frequency to the reference frequency is measured and used to calculate the mass of the substance received on the cantilever. This is possible since the dependence of the cantilever's resonant frequency on the applied magnetic field in known. From the basic knowledge of cantilevers the resonant frequency is given by $$f_r = 0.162\sqrt{\frac{E}{\rho}}\frac{t^2}{l^2} = K\rho^{-\frac{1}{2}}$$

Where E is the Young's modulus, t the thickness $\rho$ the density and l the length of the cantilever. If $f'_r$ is the resonant frequency after mass loading, then $$f'_r = K(\rho + \Delta\rho)^{-\frac{1}{2}} = K\rho^{-\frac{1}{2}}\left(1 + \frac{\Delta\rho}{\rho}\right)^{-\frac{1}{2}}.$$

For $\Delta\rho \ll \rho$ $$f'_r = K\rho^{-\frac{1}{2}}\left(1 - \frac{\Delta\rho}{\rho}\right) = f_r\left(1 - \frac{\Delta\rho}{\rho}\right).$$

Therefore the resonant frequency depends linearly on density change

The cantilever 30 shown in FIG. 3 has a length of about 100 µm, a width of about 10 µm, the thickness of the magnetostrictive material layer 34 is about 500 nm and the thickness of the substance-receiving layer 36 is about 100 nm. The length, width and thickness are chosen to suit particular resonance requirements and added mass to be detected. Typically, this detector will provide attogramme sensitivity i.e. it is sensitive enough to detect an attogramme of the desired substance upon its surface. Further advantages of this detector are that it operates wirelessly with low performance degradation. The detector is simple to manufacture (in accordance with known principles). The detector has a fast response time. The skilled person will understand how this detector can be used in various fields in which sensitive substance detection is required. For example, in security systems, such as airport security systems it may be necessary to detect traces of explosives or rycin for example. In bioscience this kind of detector maybe useful as a protein assay. In healthcare this detector may be used to monitor for the presence of MRSA in a hospital environment.

Figure 4:
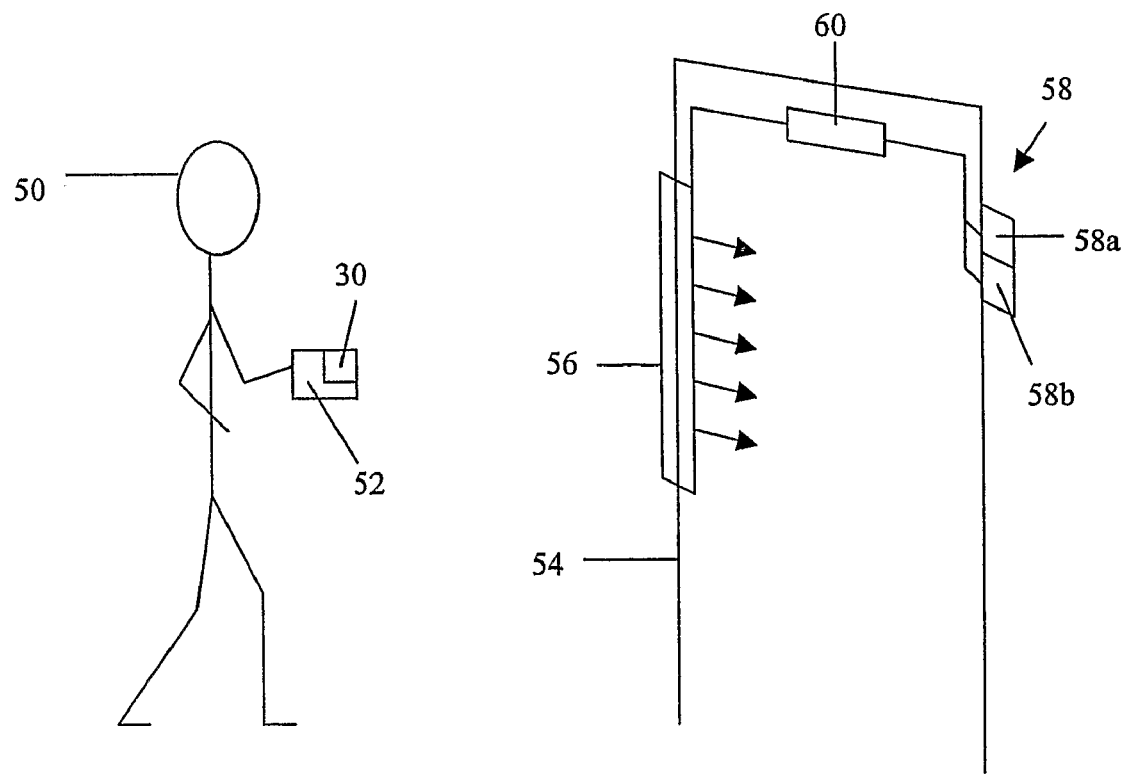
FIG. 4 is a schematic representation of a detection system according to a further embodiment of this invention.

In a further embodiment, referring to FIG. 4, in an airport environment, a person 50 carrying a ticket 52 is required to pass through a detection gate 54. The ticket 52 comprises a magnetic cantilever, for example the cantilever shown in FIG. 3. The detection gate 54 comprises a controller 60 arranged to control a magnetic field generator 56 and a sensor 58. The controller 60 controls the magnetic field generated by the magnetic field generator 56 to apply a magnetic field in the vicinity of the gate 54 and thus controls the magnetic field applied to the cantilever 30. In order to ensure that whenever some of the substance is present on the cantilever 30, a positive detection occurs, the magnetic field generator 56 is arranged to apply a magnetic field in the vicinity of the gate 54 as a DC field that varies between zero and a maximum field value. These minimum and maximum applied field values might be different in different embodiments as required. The maximum field value is sufficient in order to raise the Young's modulus of the cantilever 30 sufficiently to compensate for the change in Young's modulus caused by the added mass/density due to the substance being received on the cantilever. This occurs very quickly and the response of the cantilever 30 is also very quick—typically it takes less than one second to complete one cycle, i.e. from no applied field to maximum applied field.

As the person 50 passes through the gate 54, the resonant frequency of the cantilever 30 on the ticket 52 is changed from the original resonant frequency due to the presence of the applied magnetic field. The sensor 58 is arranged to sense signals at the original resonant frequency, i.e. the reference frequency is equal to the original resonant frequency.

The controller 60 also controls operation of the sensor 58 to sense whether or not the resonant frequency of the cantilever 30 has reached the reference frequency. The sensor 58 comprises a transmitter 58a which is arranged to transmit electromagnetic radiation at the reference frequency in a series of pulses as the applied DC magnetic field is increased. The sensor 58 also includes a receiver 58b which is arranged to receive electromagnetic radiation at the reference frequency. The sensor 58 operates by transmitting electromagnetic radiation at the reference frequency in an attempt to excite the cantilever 30 when its resonant frequency reaches the reference frequency. If the cantilever's resonant frequency is equal to the reference frequency, then due to its magnetostrictive properties the cantilever will resonate and emit electromagnetic radiation at the reference frequency. This radiation which is emitted by the cantilever 30 is detected by the receiver 58b.

In other embodiments the cantilever emits acoustic radiation when it resonates. In some embodiments, the cantilever emits to the acoustic and electromagnetic radiation when it resonates.

When the receiver 58b does detect a resonant signal emitted from the cantilever 30 (due to its resonant frequency having reached the reference frequency), the sensor 58 produces an output signal indicating this and communicates it to the controller 60.

The transmitter 58a and receiver 58b are synchronised in a known manner so that the receiver 58b does not directly detect signals transmitted by the transmitter 58a. For example, in this embodiment this is achieved by the controller 60 disregarding any signals detected at the reference frequency by the receiver 58b for a predetermined time interval following transmission by the transmitter 58a of electromagnetic pulses at the reference frequency. The time interval is set in a known manner to avoid the possibility of detection of pulses directly from the transmitter 58a.

The controller is arranged to receive the output signal from the sensor 58 and to determine the magnitude of the applied magnetic field when resonance occurs. This provides an indication of the mass of the substance captured on the cantilever. The controller can then determine whether more than a predetermined mass of substance has been captured to give a positive indication that the substance is present. Alternatively it may use the information to provide a measure of the mass of the substance captured. The controller 60 may then be linked to an alert such as a visible or audible alarm system in a known manner to provide an alert to indicate that the substance is present on the ticket 52.

In some embodiments, the controller 60 is arranged to operate the magnetic field generator 56 and the sensor 58 only when the person 50 is known to be nearby. In other embodiments they are operated substantially continuously.

It will be appreciated that in some embodiments the resonant frequency reaching the reference frequency is indicative in itself of the substance having been detected, i.e. it is not necessary to record the level/amount of applied field necessary to effect this event. This is true for cases where applying the field compensates for the effect of the detected substance (e.g. the detected substance causes the cantilever's resonant frequency to increase and the applied field causes it to decrease or vice versa).

In other embodiments it may be necessary to know (within a specified range) the amount/level of magnetic field required to bring the resonant frequency of the cantilever to the (known) reference frequency. For example, when the detected substance causes the cantilever's resonant frequency to decrease and the applied magnetic field is arranged to do the same, the level of magnetic field required to take the resonant frequency to the reference frequency is used to determine whether or not some substance has been received on the cantilever. For example, it will be expected that a particular level of magnetic field is required to decrease the resonant frequency sufficiently to reach the reference frequency in the absence of any substance having been received. If it is found that a lower level of field is actually required to take the resonant frequency to the reference frequency, this is indicative of some of the substance already having been received on the cantilever and thus having already lowered its resonant frequency to some extent (due to its effect on the average density of the cantilever). It will also be appreciated that receiving the substance may cause an increase in the resonant frequency and that the applied field can be varied to increase the resonant frequency.

Various modifications may be made to the present invention without depositing from its scope. For example, a number of different substance receiving layers maybe used depending upon which substances or types of substances are required to be detected. The detector may be designed to receive more than one substance or type of substance. In order to achieve this more than one substance-receiving layer maybe provided on the same cantilever.

In some embodiments, the sensor is arranged to detect harmonics of the fundamental resonant, reference frequency in addition to, or instead of, the reference frequency. This is possible since harmonics (signals at multiples of the reference resonance frequency) can be used to excite the cantilever.

The invention claimed is:

1. A method of detecting the presence of a substance comprising providing a cantilever comprising a magnetostrictive material and having a resonant frequency which is at an original resonant frequency; receiving the substance on the cantilever causing the resonant frequency of the cantilever to change from the original resonant frequency; applying a magnetic field to the cantilever causing the resonant frequency to change until it becomes equal to a reference resonant frequency; and sensing when the resonant frequency becomes the reference resonant frequency.

2. The method of claim 1 wherein receiving the substance causes the resonant frequency to increase and applying the magnetic field causes the resonant frequency to decrease.

3. The method of claim 1 wherein receiving the substance causes the resonant frequency to decrease and applying the magnetic field causes the resonant frequency to decrease.

4. The method of claim 1 wherein the reference frequency is equal to the original resonant frequency.

5. The method of claim 1 wherein sensing when the resonant frequency becomes the reference resonant frequency comprises generating an excitation signal at the reference resonant frequency and detecting an indicative resonant signal emitted by the cantilever in response to the excitation signal at the reference resonant frequency.

6. The method of claim 1 comprising varying the magnetic field and detecting when the resonant frequency becomes the reference frequency to determine the magnetic field strength required to cause the resonant frequency to change to the reference frequency.

7. The method of claim 1 wherein the cantilever comprises one of a MEMS cantilever and a NEMS cantilever.

8. The method claim 1 wherein receiving the substance comprises adsorbing the substance.

9. The method of claim 1 wherein applying the magnetic field comprises applying a DC magnetic field.

10. A substance detection system comprising a cantilever comprising a magnetostrictive material and having a resonant frequency which is at an original resonant frequency, the cantilever being arranged to receive the substance causing the resonant frequency of the cantilever to change from the original resonant frequency, the system further comprising a magnetic field generator arranged to apply a magnetic field to the cantilever causing the resonant frequency to change until it becomes equal to a reference resonant frequency and a sensor arranged to sense when the resonant frequency becomes the reference resonant frequency.

11. The system of claim 10 wherein the sensor is arranged to detect an indicative resonant signal emitted by the cantilever in response to an excitation signal at the reference resonant frequency.

12. The system claim 10 wherein the reference resonant frequency is equal to the original resonant frequency.

13. The system of claim 10 wherein the magnetic field generator is arranged to apply a DC magnetic field.

14. The system of claim 10 wherein the cantilever comprises one of a MEMS cantilever and a NEMS cantilever.

* * * * *